(12) United States Patent
Büttiker

(10) Patent No.: US 8,931,399 B2
(45) Date of Patent: Jan. 13, 2015

(54) BREWING APPARATUS WITH A DRAINAGE VALVE

(75) Inventor: Philipp Büttiker, Oberbuchsiten (CH)

(73) Assignee: Jura Elektroapparate Ag, Niederbuchsiten (SE)

( * ) Notice: Subject to any disclaimer, the term of this patent is extended or adjusted under 35 U.S.C. 154(b) by 1187 days.

(21) Appl. No.: 12/566,248

(22) Filed: Sep. 24, 2009

(65) Prior Publication Data

US 2010/0077927 A1     Apr. 1, 2010

(30) Foreign Application Priority Data

Sep. 26, 2008  (EP) ..................................... 08405242

(51) Int. Cl.
A47J 31/44     (2006.01)
A47J 31/36     (2006.01)
A47J 31/46     (2006.01)
A47J 36/42     (2006.01)

(52) U.S. Cl.
CPC *A47J 31/36* (2013.01); *A47J 31/46* (2013.01); *A47J 36/42* (2013.01)
USPC ................... 99/290; 99/281; 99/286; 99/287; 99/288; 99/300; 99/302 R; 99/305; 99/317; 426/433

(58) Field of Classification Search
CPC ............ A47J 36/42; A47J 31/46; A47J 31/36
USPC .......... 99/286–287, 290, 281, 288, 295, 300, 99/302 R, 305–317; 426/433
See application file for complete search history.

(56) References Cited

U.S. PATENT DOCUMENTS

| 2,730,034 | A | * | 1/1956 | Svendsgaard | .................... | 99/283 |
| 2,770,248 | A | * | 11/1956 | Audia | ............................ | 137/240 |
| 4,083,295 | A | * | 4/1978 | Hollingsworth | ................ | 99/283 |
| 4,374,025 | A | | 2/1983 | Loke | | |

(Continued)

FOREIGN PATENT DOCUMENTS

| CN | 2010-26127 Y | 2/2008 |
| EP | 0 307 497 A1 | 3/1989 |

(Continued)

OTHER PUBLICATIONS

European Search Report issued in connection with European Application No. 08405242.2 and completed on Feb. 20, 2009.

(Continued)

*Primary Examiner* — Brett Spurlock
(74) *Attorney, Agent, or Firm* — Alston & Bird LLP

(57) ABSTRACT

The invention relates to a brewing apparatus, in particular for coffee, comprising a drainage valve, which is located on the one hand in a brewing liquid path between a brewing liquid container and a brewing unit of the brewing apparatus and on the other hand, in a drainage liquid path between the brewing unit and an outlet of the brewing apparatus. In a brewing position of the drainage valve, the brewing liquid path is released and the drainage liquid path is blocked. The brewing apparatus is characterised by a drainage position of the drainage valve in which both the drainage liquid path and also the brewing liquid path are released and a decalcification position of the drainage valve in which the brewing liquid path is blocked and a decalcification liquid path is produced between the brewing liquid container and the outlet via the drainage valve.

20 Claims, 5 Drawing Sheets

(56) References Cited

U.S. PATENT DOCUMENTS

| | | | | |
|---|---|---|---|---|
| 4,407,315 | A * | 10/1983 | Haberer | 134/58 R |
| 4,421,014 | A * | 12/1983 | Vicker | 99/289 P |
| 4,575,615 | A * | 3/1986 | Shigenobu et al. | 392/450 |
| 4,603,621 | A * | 8/1986 | Roberts | 99/307 |
| 4,714,011 | A * | 12/1987 | Ly | 99/279 |
| 4,715,274 | A * | 12/1987 | Paoletti | 99/454 |
| 4,735,133 | A * | 4/1988 | Paoletti | 99/454 |
| 4,757,752 | A * | 7/1988 | Robins et al. | 99/279 |
| 4,779,519 | A * | 10/1988 | Giuliano | 99/275 |
| 4,994,392 | A * | 2/1991 | Welledits et al. | 99/278 |
| 5,115,730 | A * | 5/1992 | Gockelmann | 99/280 |
| 5,158,793 | A * | 10/1992 | Helbling | 426/231 |
| 5,259,296 | A * | 11/1993 | Mikael et al. | 99/280 |
| 5,302,407 | A * | 4/1994 | Vetterli | 426/433 |
| 5,309,822 | A * | 5/1994 | Sager | 99/289 R |
| 5,367,947 | A * | 11/1994 | Lussi et al. | 99/287 |
| 5,490,447 | A * | 2/1996 | Giuliano | 99/286 |
| 6,237,811 | B1 * | 5/2001 | Ford | 222/129.1 |
| 6,561,079 | B1 * | 5/2003 | Muller et al. | 99/282 |
| 6,626,190 | B2 * | 9/2003 | Durth et al. | 134/22.18 |
| 7,178,452 | B2 * | 2/2007 | Fischer | 99/280 |
| 7,219,597 | B2 * | 5/2007 | Eicher | 99/293 |
| 7,322,275 | B2 * | 1/2008 | Lussi | 99/281 |
| 7,350,457 | B2 * | 4/2008 | Wessels et al. | 99/323.1 |
| 7,353,752 | B2 * | 4/2008 | Blanc | 99/298 |
| 7,927,642 | B2 * | 4/2011 | Campetella et al. | 426/433 |
| 2002/0017199 | A1 * | 2/2002 | Durth | 99/330 |
| 2003/0003208 | A1 * | 1/2003 | Lassota | 426/433 |
| 2003/0051606 | A1 * | 3/2003 | Cusenza et al. | 99/357 |
| 2003/0089244 | A1 * | 5/2003 | Imboden et al. | 99/453 |
| 2003/0232115 | A1 * | 12/2003 | Eckenhausen et al. | 426/477 |
| 2005/0051033 | A1 * | 3/2005 | Lassota | 99/283 |
| 2005/0066820 | A1 * | 3/2005 | Lussi | 99/279 |
| 2005/0118047 | A1 * | 6/2005 | Sorensen | 417/440 |
| 2006/0090653 | A1 * | 5/2006 | McDuffie et al. | 99/279 |
| 2006/0156928 | A1 * | 7/2006 | Wang | 99/280 |
| 2006/0207432 | A1 * | 9/2006 | Van Der Meer et al. | 99/279 |
| 2007/0031558 | A1 * | 2/2007 | Lussi | 426/520 |
| 2007/0068393 | A1 * | 3/2007 | Nosler et al. | 99/279 |
| 2008/0041235 | A1 * | 2/2008 | Kramer et al. | 99/293 |

FOREIGN PATENT DOCUMENTS

| | | |
|---|---|---|
| EP | 0 559 620 A1 | 3/1993 |
| EP | 0 561 741 A1 | 9/1993 |
| EP | 0 538 191 A1 | 1/1996 |
| EP | 1 312 291 A1 | 5/2003 |
| WO | WO-2007-134956 A1 | 11/2007 |

OTHER PUBLICATIONS

Search Report from Application No. 200910176160.0, dated Dec. 27, 2012.

* cited by examiner

BREWING APPARATUS WITH A DRAINAGE VALVE

CROSS-REFERENCE TO RELATED APPLICATIONS

This application claims priority to and the benefit of the filing date of European Application No. 08405242.2, filed on Sep. 26, 2008, the contents of which are incorporated by reference herein.

FIELD OF THE INVENTION

The invention relates to a brewing apparatus with a drainage valve.

BACKGROUND OF THE INVENTION

Already known from the patent specification EP 0 559 620 B1 is a brewing apparatus for coffee comprising a tiltable brewing cylinder in which a brewing water intake engages in a lower connection on the brewing cylinder. A valve is provided in the brewing water intake, which opens at the end of the brewing process and allows residual water to drain out. A clean brewing chamber and a dry coffee cake can thereby be achieved. On the other hand, a decalcification means used to clean the fluid system is not prevented from penetrating into the brewing chamber and damaging the material thereof. As a result, the lifetime of the unit is massively reduced.

BRIEF SUMMARY OF THE INVENTION

It is the object of the present invention to avoid the said disadvantages and provide a brewing apparatus with a control valve which allows a more targeted provision of fluids in a brewing, drainage and decalcification process of the apparatus. The valve should additionally be configured constructively simply and therefore be particularly reliable, long-lived and cost-effective.

This object is achieved by a brewing apparatus having a drainage valve with certain features. A brewing apparatus for producing coffee beverages is thus provided that includes a liquid container for a brewing liquid or a decalcification liquid, a brewing unit including a brewing chamber being configured for brewing coffee, an outlet, and a drainage valve configured to be brought into three different positions, such as a brewing position, a drainage position, and a decalcification position. The drainage valve may be arranged with respect to the liquid container, the brewing unit, and the outlet such that when the drainage valve is in the brewing position, a brewing liquid path is provided between the liquid container and the brewing chamber via the drainage valve enabling an amount of the brewing liquid to flow into the brewing chamber for brewing coffee with the brewing liquid in the brewing chamber. When the drainage valve is in the drainage position, a drainage liquid path may be provided between the brewing unit and the outlet via the drainage valve enabling a drainage fluid coming from the brewing unit to flow to the outlet. When the drainage valve is in the decalcification position, a decalcification liquid path may be provided between the liquid container and the outlet via the drainage valve enabling an amount of the decalcification liquid to flow from the liquid container to the outlet. The drainage valve may be configured to block the drainage liquid path when the drainage valve is in the brewing position and to block the brewing liquid path when the drainage valve is in the decalcification position.

An important point of the invention consists in that the drainage valve can be brought into three different positions, each being ascribed a precisely defined function in each case. In a brewing position of the drainage valve, the brewing liquid path is released and the drainage liquid path is blocked, as is already known. Taking this as the starting point, in a drainage position of the drainage valve, use is now initially made of the circumstance that in the drainage process fundamentally no brewing liquid is supplied, since, for example, a pump responsible for this is not activated. As a result, the brewing liquid path need not additionally be blocked when the drainage liquid path is released. This makes the structure of the drainage valve particularly simple. In addition, the drainage valve is designed so that in a decalcification position, the brewing liquid path to the brewing unit or to a brewing chamber of the brewing unit is blocked and at the same time, a decalcification path is produced between the brewing liquid container and the outlet via the drainage valve. This ensures that no decalcification means can enter into the brewing chamber and reach plastic parts of the brewing apparatus, which significantly increases their lifetime.

In an advantageous embodiment of the brewing apparatus, it is provided that the drainage valve comprises a cylindrical sleeve with an inlet for the brewing liquid coming from the brewing liquid container and an outlet for the drainage liquid coming from the brewing unit, which are disposed in a manner offset with respect to one another on their circumference such that in a horizontal mounting position of the sleeve, its inlet is located at a higher position than its outlet.

A further simplification of the structure of the brewing apparatus is achieved by the drainage valve having an outlet for the brewing liquid flowing to the brewing unit and an inlet for the drainage liquid coming from the brewing unit, and this outlet and this inlet are designed as a common brewing and drainage connection. As a result, the brewing apparatus can be made smaller, which in turn saves costs. On the other hand, space obtained by combining outlet and inlet can be used to achieve additional functions of the brewing apparatus.

In a specific embodiment of the brewing apparatus it is provided that the drainage valve has a waisted piston (i.e. a piston which has a "waist section" i.e., a longitudinal section configured as a waist and at each of the two ends of this waist section, respectively one "flange section" with an enlarged diameter compared with the waist section) which is guided centrally in a sleeve and which is movable in the longitudinal direction of the sleeve in such a manner that the piston can be inserted to different depths in the sleeve and can be held in different positions which are accordingly characterised by different insertion depths of the piston. Located inside the sleeve are three successive (in the longitudinal direction of the sleeve) spaces which can be sealed with respect to one another (hereinafter "sealing spaces"), wherein in each case two adjacent spaces are separated by respectively one sealing collar. The respective sealing collars each have a through opening through which the piston is guided and which, depending on the insertion depth of the piston and depending on the spatial position of the waist section or the flange sections of the piston, can be closed with the aid of the piston. In one position of the piston, the waist section or the flange sections are disposed relative to the sealing collars in such a manner that the waist section passes in a non-contact manner through two sealing collars disposed successively in the sleeve so that three sealing spaces communicating with one another via the through openings of the sealing collars, separated by the two sealing collars, are formed. At other insertion depths of the piston at which one of the piston sections abuts sealingly against one of the collars, on the other hand respectively two adjacent sealing spaces are formed, which communicate with one another but are sealed with respect to the respective third sealing space. Thus, by simple adjustments of the insertion depth of the piston, three different sealing space combinations can be formed, which provide the brewing, drainage and decalcification function of the drainage valve. Such a simply constructed drainage valve is easy to manufacture from the production technology viewpoint, reliable and cost-effective.

In the previously described specific embodiment of the brewing apparatus, an inlet for the brewing liquid coming from the brewing liquid container and an outlet for the drainage liquid coming from the brewing unit are formed in the sealing space of the drainage valve which lies between the two sealing collars disposed in the sleeve. This allows a particularly simple functional assignment of the outer sealing spaces to the brewing or the decalcification process which form a liquid path in each case clearly separated from one another. On the other hand, drainage of the brewing unit is possible by simply connecting all three sealing spaces. All this requires merely one corresponding displacement of the piston in the sleeve which can simply be automated. In this case, a linear stepping motor is preferably provided for adjusting the piston in the drainage valve.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Further details of the invention are explained hereinafter with reference to an exemplary embodiment of the brewing apparatus by reference to the appended drawings. Parts which are the same or have the same effect are provided with the same reference numerals. In the figures:

FIG. 5 shows a longitudinal section through the brewing apparatus from FIG. 1 with the drainage valve built in.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
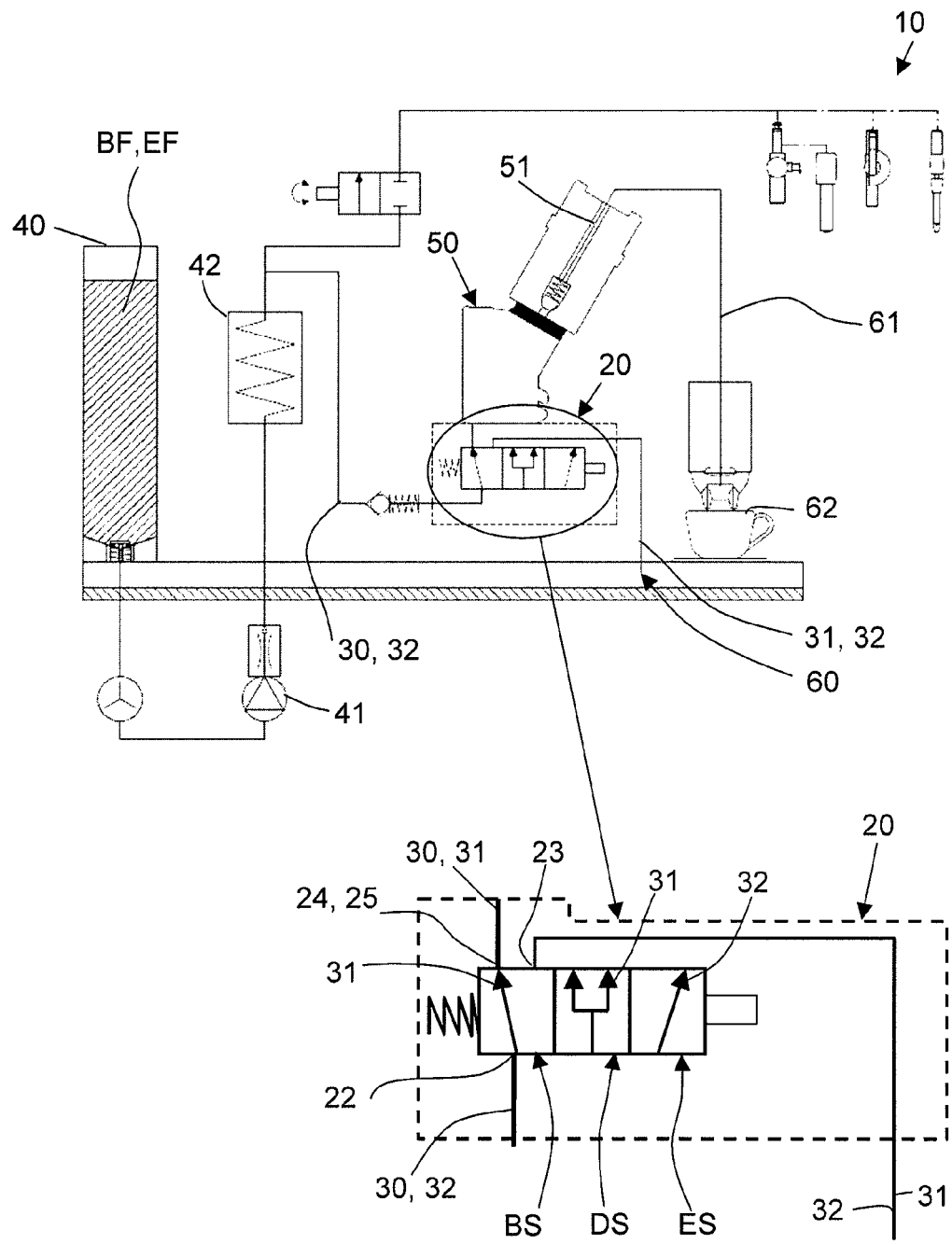
FIG. 1 shows the fluid system of a brewing apparatus according to the invention with a drainage valve.

FIG. 1 shows the fluid system of a brewing apparatus 10 according to the invention with a drainage valve 20. The apparatus 10 is here intended to constitute a coffee machine in which the drainage valve 20 is firstly disposed in a brewing liquid or brewing water path 30 for a brewing liquid BF (for example, water), extending between a brewing liquid or brewing water container 40 (hereinafter "container 40") and a brewing unit 50. On the other hand, the drainage valve 20 is disposed in a drainage liquid or residual water path 31 extending between the brewing unit 50 and an outlet 60 which leads, for example, into a residual water dish. Furthermore, a decalcification liquid path 32 is provided for a decalcification liquid EF, which extends from the container 40 via the drainage valve 20 to the outlet 60 and via which a decalcification liquid (for decalcifying the fluid system) can be passed.

In a brewing position BS of the drainage valve 20, as will be explained in further detail in connection with FIG. 2, brewing water from the container 40 is supplied to the brewing unit 50. To this end, a feed pump 41 and a thermoblock 42 for heating the liquid transported in each case via the brewing water path 30 is disposed in the brewing water path 30. In a drainage position DS of the drainage valve 20, as will be explained in further detail in connection with FIG. 3, a connection is made between brewing unit 50 and outlet 60 via which the residual water pressed out from the coffee cake can drain. Finally, in a decalcification position ES of the drainage valve 20, as will be explained in further detail in connection with FIG. 4, a connection is made between the container 40 and the outlet 60 to clean the fluid system without involving the brewing unit 50. As a result, this cannot be damaged or the coffee taste adversely affected.

The three valve positions BS, DS, ES of the drainage valve 20 can be approached as required by a linear stepping motor 70 which is shown in the following FIGS. 2 to 4 in conjunction with these positions. Compared with an electromagnetic drive, the linear stepping motor drive has the advantage that a plurality of positions can be approached and that this drive is additionally very quiet.

During the brewing process itself, the water is pumped from the container 40 via pump 41 further via the drainage valve 20 into the brewing chamber of the brewing unit 50. In one brewing chamber 52 of the brewing unit 50, which will be explained in further detail in connection with FIG. 5, a brewing pressure then builds up until the counter-pressure of a frothing valve becomes lower and opens. After the frothing valve opened, the brewed coffee passes via an ascending pipe 51 to a brewing liquid or coffee outlet 61 and into a cup 62.

Figure 2:
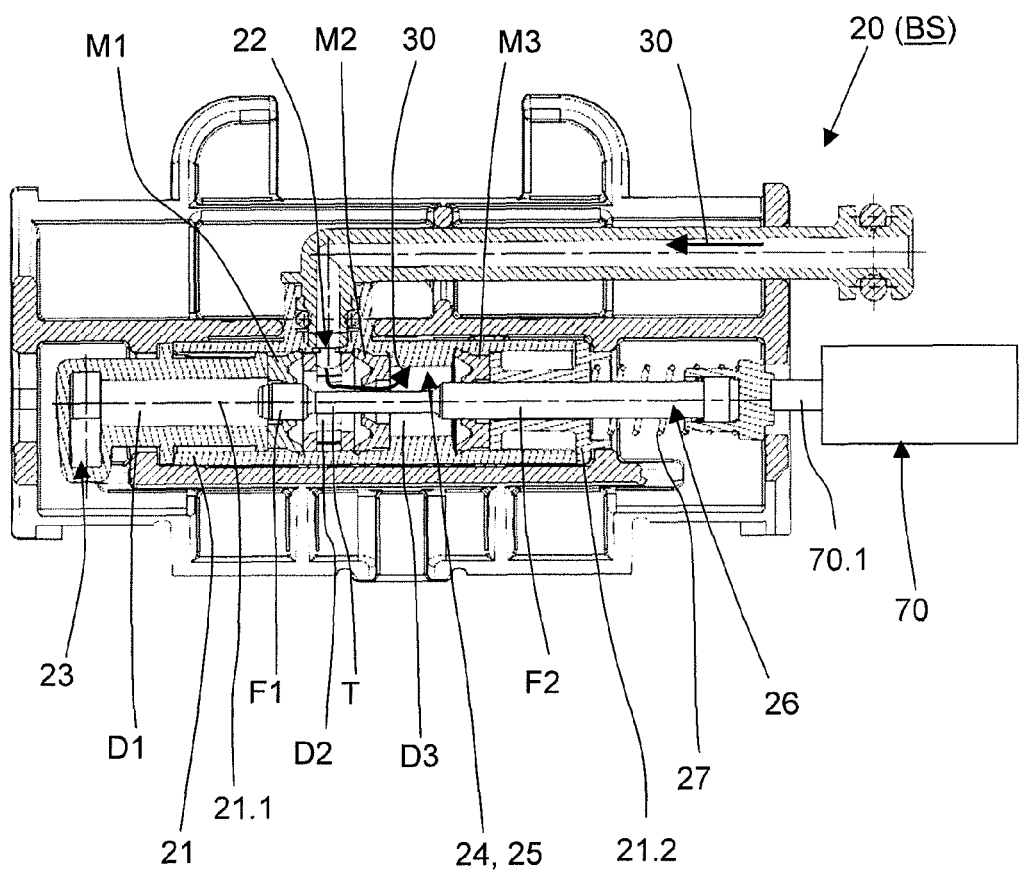
FIG. 2 shows a longitudinal section through the drainage valve from FIG. 1 in its brewing position.

FIG. 2 shows a longitudinal section through the drainage valve 20 of FIG. 1 in a brewing position BS of a piston 26. An inlet 22 for brewing water is attached to the upper circumference of a sleeve 21 of the drainage valve 20 whilst an outlet 23 for the residual water is located on the (left) lower circumference of the sleeve 21. An outlet 25 for residual water from the brewing unit 50 and an inlet 24 for brewing water to the brewing unit 50 are designed as a common brewing and drainage connection 24, 25 which extends rearwards and upwards starting from the sleeve 21.

Figure 3:
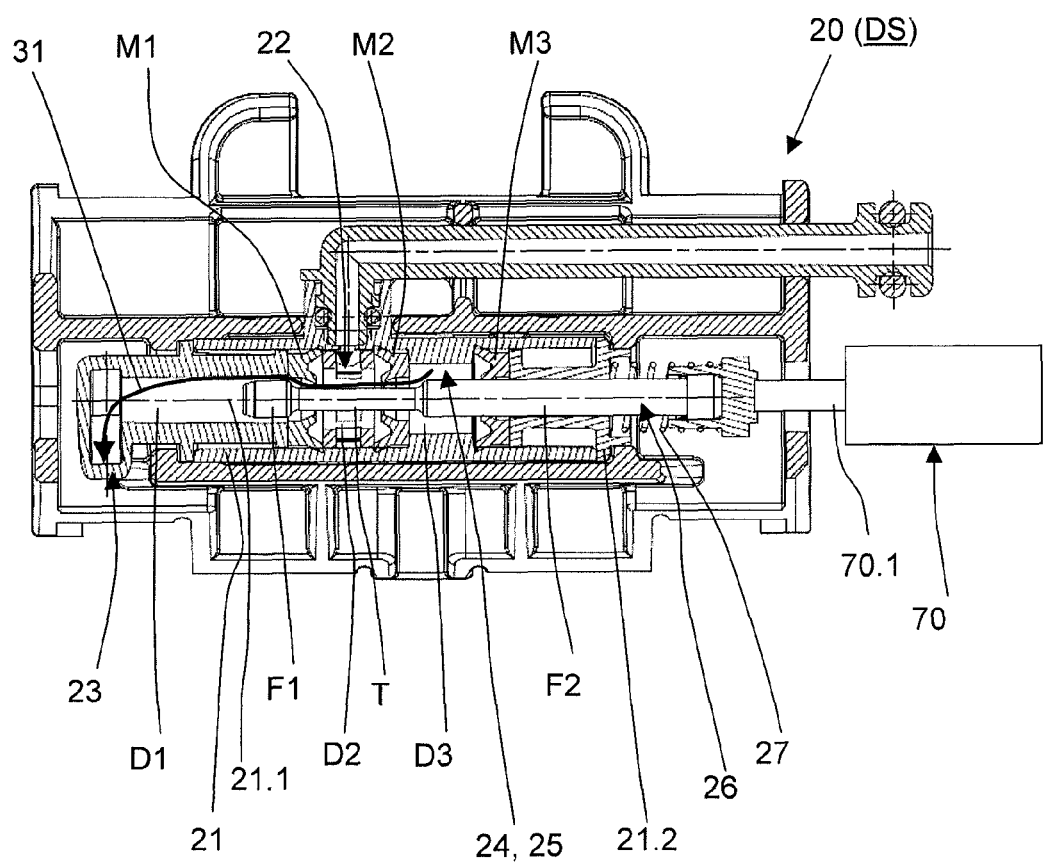
FIG. 3 shows a longitudinal section through the drainage valve from FIG. 2 in its drainage position.
Figure 4:
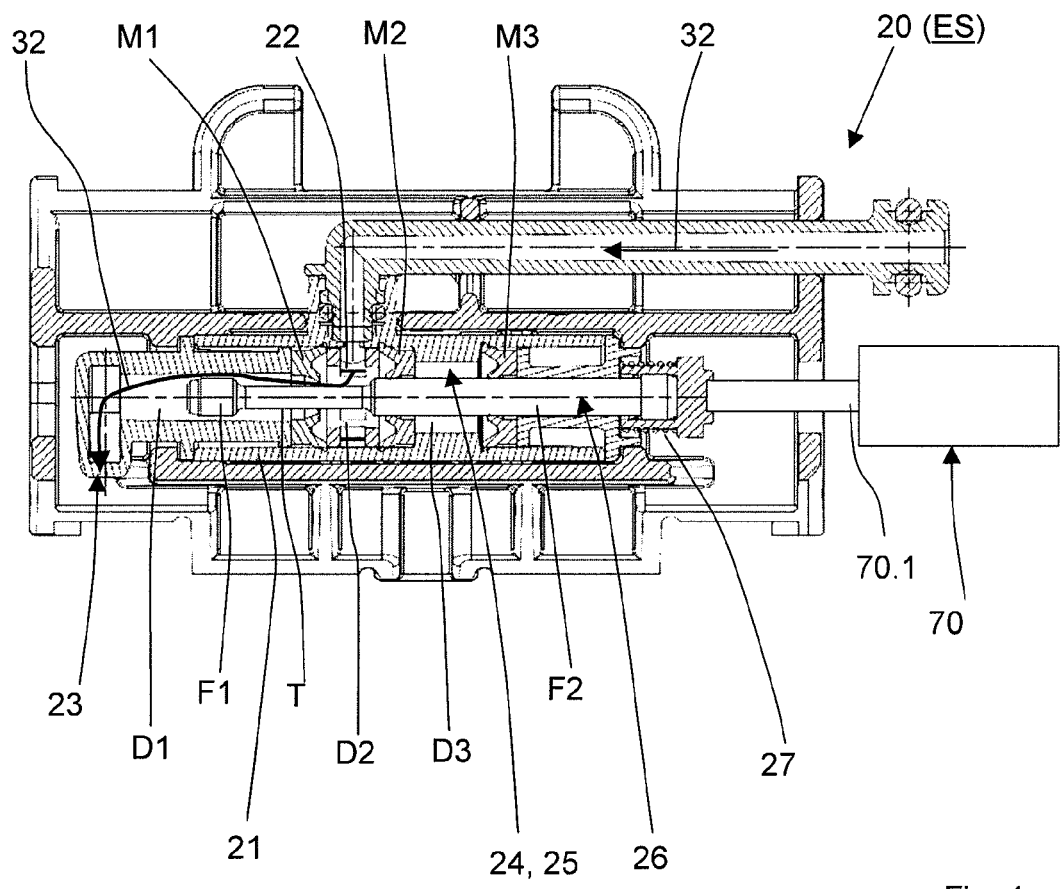
FIG. 4 shows a longitudinal section through the drainage valve from FIG. 2 in its decalcification position.

As shown in FIGS. 2-4, sealing collars M1, M2 and M3 are disposed inside the sleeve 21 in each case at a distance from one another so that the sealing collars M1, M2 and M3 delimit three sealing spaces disposed successively (in the longitudinal direction of the sleeve): (i) a sealing space D1 between the sealing collar M1 and the outlet 23, (ii) a sealing space D2 between the sealing collars M1 and M2, and (iii) a sealing space D3 between the sealing collars M2 and M3. The sealing collars M1, M2 and M3 each have central through openings in the area of the longitudinal axis 21.1 of the sleeve 21. These through openings can be closed or made continuous with the aid of a piston 26 which is movable along the longitudinal axis 21.1 of the sleeve 21 and can be guided in each case through the said through openings (depending on the arrangement of the piston 26 relative to the collars M1, M2 and M3). For this purpose the piston 26 has three longitudinal sections disposed successively (in the longitudinal direction of the piston 26) having different diameters: two flange sections F1 and F2 disposed at a distance from one another, each having the same diameter, and a waist section T disposed between the flange sections F1 and F2 (having a smaller diameter than the flange sections F1 and F2).

The diameters of the flange regions F1 and F2 are determined such that the through openings of the sealing collars M1, M2 or M3 can be closed and therefore sealed with the aid of one of the flange sections F1 or F2 whilst the waist section T can optionally pass through the respective through opening of one of the sealing collars M1, M2 or M3 without touching the respective sealing collar. The length of the waist section T is determined such that in one position of the piston 26 (see FIG. 3), the waist section T passes through, for example, the sealing collars M1, M2 without contact so that the through openings of the sealing collars M1, M2 are continuous for a liquid and therefore all the sealing spaces D1, D2 and D3 are configured to be intercommunicating spaces. In other positions of the piston 26 (see FIGS. 2 and 4), the through openings of the sealing collars M1, M2 or M3 can be closed as desired with the aid of one of the flange sections F1 or F2 so that in these positions, either the sealing spaces D1 and D2 can communicate with one another (without a continuous connection to the sealing space D3 existing) or the sealing spaces D2 and D3 can communicate with one another (without a continuous connection to the sealing space D1 existing). Accordingly, different combinations of intercommunicating sealing spaces D1-D3 can be achieved by adjusting the piston 26. The piston 26 itself is moved by means of the linear stepping motor 70.

At the edge of their through opening, each of the sealing collars M1, M2 and M3 have a flexible sealing lip which, under the action of a liquid pressure, can be pressed against the piston 26 or one of the flange sections F1 or F2 in such a manner that the respective sealing collar can be sealed against the piston 26. The sealing collars M1, M2, M3 are thereby additionally expanded in a swallowtail manner by the acting pressure in order to increase their pressing against the flange section F1, F2.

Such sealing collars have the advantage that they ensure low friction with respect to the piston 26 and in contact with the piston 26 itself they ensure a sufficient seal with respect to a liquid if the respective parts (sealing collars, piston) have tolerance deviations. The piston 26 is preferably made of metal and has a polished surface. Under these conditions, the respective position of the piston 26 can be changed with a particularly small force so that the stepping motor 70 only needs to apply correspondingly small forces and can be suitably designed. In addition, relatively large tolerances are acceptable with regard to the shape of the sealing collars. The piston could, however, also be made of plastic, in which case the tolerance regarding the dimensions of the respective parts is greater than in the case of a metal piston.

Figure 5:
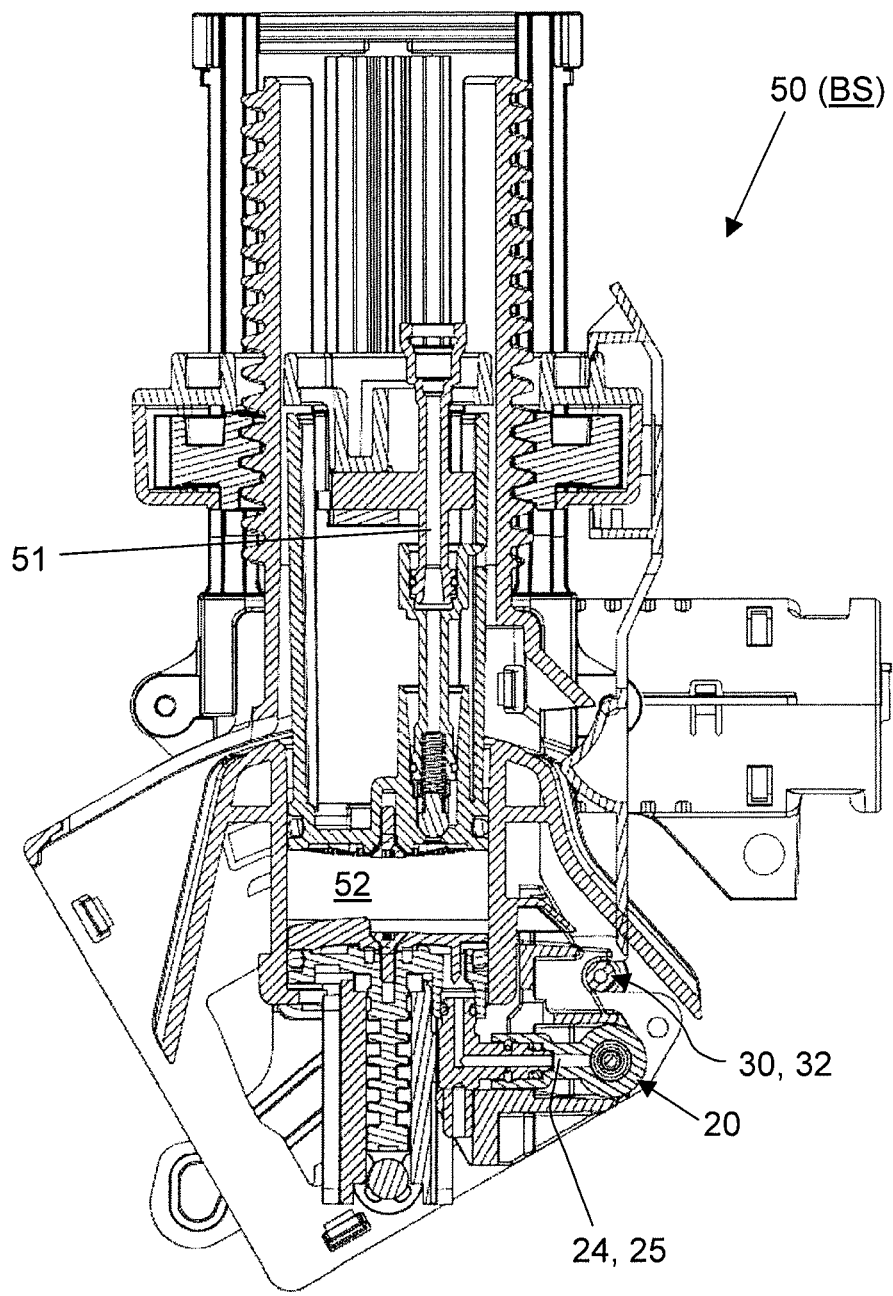

As FIGS. 3-5 show, the piston 26 in the area of the flange section F2 is guided through a through opening of an insert 21.2 inserted in an end section of the sleeve 21. The insert 21.2 is configured in such a manner that the piston 26 is movable in its longitudinal direction relative to the insert 21.2. The stepping motor 70 comprises a driven push rod 70.1 which is movable linearly in the direction of its longitudinal extension during operation of the stepping motor 70 and is disposed in such a manner relative to the drainage valve 20 that one end of the push rod 70.1 pushes against the end of the piston 26 projecting from the sleeve 21 and is movable in the longitudinal direction of the piston 26.

In the present example, the piston 26 is not rigidly connected to the stepping motor 70 but merely brought in contact with the push rod 70.1 in order to achieve a mechanical coupling between the piston 26 and the stepping motor 70. This type of coupling between the piston 26 and the stepping motor 70 simplifies the dismantling of the brewing unit 50 from the brewing apparatus 10 and simplifies maintenance of the brewing apparatus 10, especially as the brewing unit 50 together with the drainage valve 20 but independently of the stepping motor 70 can be dismantled from the brewing apparatus 10 without needing to loosen a rigid connection to the stepping motor 70.

In order to ensure that the piston 26 stays in contact with the push rod 70.1 when the push rod 70.1 is moved forward and backward its longitudinal direction during operation of the stepping motor 70, the end of the piston 26 projecting from the sleeve 21 is supported on the insert 21.2 via a spring 27. Accordingly, the spring 27 is tensioned when the piston 26 is pushed into the sleeve 21 by means of the push rod 70.1. If the distance between the push rod 70.1 and the insert 21.2 is enlarged again, the spring 27, if this is tensioned, presses the piston 26 against the push rod 70.1 and holds the push rod 70.1 in contact with the piston 26. In the present case, the spring 27 is dimensioned so that, without the action of additional forces, i.e. in particular without the assistance of the stepping motor 70, the spring 27 pushes the piston 26 so far out from the sleeve 21 that the flange part F1 of the piston 26 closes the through opening of the sealing collar M1. This position of the drainage valve 20 is considered in this context to be the "base position" of the drainage valve 20. This base position corresponds to the aforesaid brewing position BS.

Unlike the previously specified construction, it is also possible to couple the push rod 70.1 of the stepping motor 70 via a rigid connection to the piston 26. In this case, the spring 26 could be eliminated.

FIG. 2 shows the brewing position BS (so-called "0-position" or "coffee position") of the piston 26. This position is active in the switched-off state, when coffee is ready and when dispensing coffee. The valve passage to the brewing space or to the brewing chamber 52 is open in this case via the sealing spaces D2, D3, the through openings of the sealing collars M1 and M3 are closed. In this position of the piston 26, a brewing liquid BF (e.g. water) can pass via the brewing liquid path 30 comprising the inlet 22 and the sealing spaces D2 and D3 and the outlet 24, into the brewing space or the brewing chamber 52, as indicated by FIG. 2 by a plurality of arrows characterised by the reference numeral "30".

FIG. 3 shows a longitudinal section through the drainage valve 20 of FIG. 2 in a drainage position DS of the piston 26. This valve position is approached directly after the brewing process. In this position, the valve passage from the common brewing and drainage connection 24, 25 to the outlet 25 for the residual water is open via all the sealing spaces D1, D2 and D3. The brewing apparatus presses the coffee powder out, the residual water (drainage liquid) runs via the drainage liquid path 31 comprising the sealing spaces D1, D2, D3 and the outlet 23 and the outlet 60, e.g. into a residual water dish (as indicated in FIG. 3 by an arrow provided with the reference numeral "31"). This pressing out is necessary so that the coffee cake can be discarded from the brewing apparatus pressed compactly in a coherent manner and therefore without any problems, dry and leaving behind a clean brewing chamber 52.

FIG. 4 shows a longitudinal section through the drainage valve 20 of FIG. 2 in the decalcification position ES. This valve position is only triggered during the entire decalcification process. An automatic decalcification can be provided for this whereby the fluid system can be freed from chalk as required. The valve passage from the inlet 22 for the brewing liquid BF or the decalcification liquid EF to the outlet 23 for the residual water via the sealing spaces D2, D1 is then opened. However, the through opening of the sealing collar M2 is closed by the flange part F2 of the piston 26. Thus, the sealing space D3 is not accessible for the decalcification liquid EF following the decalcification path 32. This ensures that the decalcification liquid does not enter into the brewing unit 50 but is led off specifically via the outlet 60, e.g. into the residual water dish. This is necessary because the material of the brewing unit is not resistant to the decalcification liquid EF and as a result, the lifetime of the brewing unit 50 can be increased substantially. In FIG. 4 arrows provided with the reference numeral "32" represent the flow of decalcification liquid along the decalcification liquid path 32.

FIG. 5 shows a longitudinal section through the brewing unit 50 of FIG. 1 with the drainage valve 20 built therein. The drainage valve 20 is built in at a lower end of the brewing unit 50 in a horizontal mounting position. The joint brewing and drainage channel 24, runs from the drainage valve 20 upwards to the brewing chamber 52 of the brewing unit 50. The brewed coffee is fed via the ascending pipe 51 to the coffee outlet 61 and the cup 62.

According to the embodiment of the brewing device according to the invention described here, the liquids guided in the fluid system can be guided by only one single drainage valve so that no impairment of the function and lifetime of the brewing unit occurs. The brewing apparatus is therefore simply constructed, increasing its reliability and at the same time bringing a cost advantage.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the claimed embodiments. Although specific terms are employed herein, they are used in a generic and descriptive sense only and not for purposes of limitation.

That which is claimed:

1. A brewing apparatus for producing coffee beverages, comprising
    a liquid container for a brewing liquid or a decalcification liquid,
    a brewing unit including a brewing chamber being configured for brewing coffee,
    an outlet,
    a drainage valve being configured to be brought into three different positions, wherein the three different positions include a brewing position, a drainage position and a decalcification position, wherein the drainage valve is arranged with respect to the liquid container, the brewing unit and the outlet so that,
    when the drainage valve is in the brewing position a brewing liquid path is provided between the liquid container and the brewing chamber via the drainage valve enabling an amount of the brewing liquid to flow via the drainage valve into the brewing chamber for brewing coffee with the brewing liquid in the brewing chamber, and,
    when the drainage valve is in the drainage position a drainage liquid path is provided between the brewing unit and the outlet via the drainage valve enabling a drainage luquid coming from the brewing chamber to flow via the drainage valve to the outlet, and,
    when the drainage valve is in the decalcification position a decalcification liquid path is provided between the liquid container and the outlet via the drainage valve enabling an amount of the decalcification liquid to flow from the liquid container via the drainage valve to the outlet, and
    wherein the drainage valve is configured to block the drainage liquid path when the drainage valve is in the brewing position and to block the brewing liquid path when the drainage valve is in the decalcification position.

2. The brewing apparatus according to claim 1, wherein the drainage valve comprises a cylindrical sleeve with an inlet for the brewing liquid coming from the liquid container and an outlet for the drainage liquid coming from the brewing unit, which are placed in a manner offset with respect to one another on their circumference such that in a horizontal mounting position of the sleeve, its inlet is located at a higher position than its outlet.

3. The brewing apparatus according to claim 1, wherein the drainage valve has an outlet for the brewing liquid flowing to the brewing unit and an inlet for the drainage liquid coming from the brewing unit, and this outlet and this inlet are designed as a common brewing and drainage connection.

4. The brewing apparatus according to claim 1, wherein the drainage valve has a sleeve, two sealing collars disposed in the sleeve and a waisted piston which is guided centrally in the sleeve, each of the two sealing collars having a through opening, the waisted piston having a waist section and being configured to be brought into a position in which the waist section of the piston passes through each through opening of each of the two sealing collars without touching the two sealing collars, the two sealing collars being disposed successively in the sleeve so that the two sealing collars divide three sealing spaces each adjoining at least one of the sealing collars, each through opening providing a continuous fluid connection between two of the three sealing spaces.

5. The brewing apparatus according to claim 4, wherein the piston has respectively one flange section at each of the two ends of the waist section and is configured to be brought into one of the brewing position and the decalcification position as desired in which respectively one of the flange sections abuts sealingly against one of the two sealing collars and the waist section passes through the through opening of the other one of the two sealing collars so that in each case two of the sealing spaces are in communication with each other and are sealed with respect to the respectively third sealing space.

6. The brewing apparatus according to claim 5, wherein an inlet for the brewing liquid coming from the liquid container is formed in the sealing space of the drainage valve which lies between the two sealing collars disposed in the sleeve.

7. The brewing apparatus according to claim 6, wherein the outlet for the brewing liquid flowing to the brewing unit, the inlet for the brewing liquid coming from the liquid container and the outlet for the drainage liquid flowing from the drainage valve open into respectively different sealing spaces.

8. The brewing apparatus according to claim 4, wherein a linear stepping motor is provided for adjusting the piston in the drainage valve.

9. The brewing apparatus according to claim 2, wherein the drainage valve has an outlet for the brewing liquid flowing to the brewing unit and an inlet for the drainage liquid coming from the brewing unit, and this outlet and this inlet are designed as a common brewing and drainage connection.

10. The brewing apparatus according to claim 2, wherein the drainage valve has a sleeve, two sealing collars disposed in the sleeve and a waisted piston which is guided centrally in the sleeve, each of the two sealing collars having a through opening, the waisted piston having a waist section and being configured to be brought into a position in which the waist section of the piston passes through each through opening of each of the two sealing collars without touching the two sealing collars, the two sealing collars being disposed successively in the sleeve so that the two sealing collars divide three sealing spaces each adjoining at least one of the sealing collars, each through opening providing a continuous fluid connection between two of the three sealing spaces.

11. The brewing apparatus according to claim 10, wherein the piston has respectively one flange section at each of the two ends of the waist section and is configured to be brought into one of the brewing position and the decalcification position as desired in which respectively one of the flange sections abuts sealingly against one of the two sealing collars and the waist section passes through the through opening of the other one of the two sealing collars so that in each case two of the sealing spaces are in communication with each other and are sealed with respect to the respectively third sealing space.

12. The brewing apparatus according to claim 11, wherein an inlet for the brewing liquid coming from the liquid container is formed in the sealing space of the drainage valve which lies between the two sealing collars disposed in the sleeve.

13. The brewing apparatus according to claim 12, wherein the outlet for the liquid flowing to the brewing unit, the inlet for the brewing liquid coming from the brewing liquid container and the outlet for the drainage liquid flowing from the drainage valve open into respectively different sealing spaces.

14. The brewing apparatus according to claim 10, wherein a linear stepping motor is provided for adjusting the piston in the drainage valve.

15. The brewing apparatus according to claim 3, wherein the drainage valve has a sleeve, two sealing collars disposed in the sleeve and a waisted piston which is guided centrally in the sleeve, each of the two sealing collars having a through opening, the waisted piston having a waist section and being configured to be brought into a position in which the waist section of the piston passes through each through opening of each of the two sealing collars without touching the two sealing collars, the two sealing collars being disposed successively in the sleeve so that the two sealing collars divide three sealing spaces each adjoining at least one of the sealing collars, each through opening providing a continuous fluid connection between two of the three sealing spaces.

16. The brewing apparatus according to claim 15, wherein the piston has respectively one flange section at each of the two ends of the waist section and is configured to be brought into one of the brewing position and the decalcification position as desired in which respectively one of the flange sections abuts sealingly against one of the two sealing collars and the waist section passes through the through opening of the other one of the two sealing collars so that in each case two of the sealing spaces are in communication with each other and are sealed with respect to the respectively third sealing space.

17. The brewing apparatus according to claim 16, wherein an inlet for the brewing liquid coming from the liquid container is formed in the sealing space of the drainage valve which lies between the two sealing collars disposed in the sleeve.

18. The brewing apparatus according to claim 17, wherein the outlet for the brewing liquid flowing to the brewing unit, the inlet for the brewing liquid coming from the liquid container and the outlet for the drainage liquid flowing from the drainage valve open into respectively different sealing spaces.

19. The brewing apparatus according to claim 15, wherein a linear stepping motor is provided for adjusting the piston in the drainage valve.

20. The brewing apparatus according to claim 7, wherein a linear stepping motor is provided for adjusting the piston in the drainage valve.

* * * * *

UNITED STATES PATENT AND TRADEMARK OFFICE
CERTIFICATE OF CORRECTION

PATENT NO.        : 8,931,399 B2                                    Page 1 of 1
APPLICATION NO.   : 12/566248
DATED             : January 13, 2015
INVENTOR(S)       : Büttiker It is certified that error appears in the above-identified patent and that said Letters Patent is hereby corrected as shown below:

<u>Title page,</u>
Item (73) Assignee: "Jura Elektroapparate Ag, Niederbuchsiten (SE)" should read
--Jura Elektroapparate AG, Niederbuchsiten (CH)--.

Signed and Sealed this
Second Day of February, 2016

Michelle K. Lee
*Director of the United States Patent and Trademark Office*